(12) United States Patent
Gand et al.

(10) Patent No.: US 10,259,059 B2
(45) Date of Patent: Apr. 16, 2019

(54) METHOD AND TOOL FOR PRODUCING A SURFACE OF PREDETERMINED ROUGHNESS

(71) Applicants: Martinrea Honsel Germany GmbH, Meschede (DE); Guehring KG, Albstadt (DE)

(72) Inventors: Bernhard Gand, Eschweiller (DE); Frank Orlamünder, Anröchte (DE); Horst Reimann, Meschede (DE); Holger Ast, Albstadt (DE); Lutfi Bozkurt, Winterlingen (DE); Peter Sommerfeldt, Hallungen (DE)

(73) Assignees: Martinrea Honsel Germany GmbH, Meschede (DE); Guehring KG, Albstadt (DE)

( * ) Notice: Subject to any disclaimer, the term of this patent is extended or adjusted under 35 U.S.C. 154(b) by 0 days.

(21) Appl. No.: 14/138,932

(22) Filed: Dec. 23, 2013

(65) Prior Publication Data
US 2014/0227046 A1 Aug. 14, 2014

Related U.S. Application Data

(62) Division of application No. 12/362,528, filed on Jan. 30, 2009, now Pat. No. 9,643,265.

(30) Foreign Application Priority Data

Aug. 5, 2008 (DE) .................. 10 2008 036 454
Sep. 12, 2008 (DE) .................. 10 2008 046 944
Nov. 21, 2008 (DE) .................. 10 2008 058 452

(51) Int. Cl.
*B23D 37/22* (2006.01)
*B23B 27/06* (2006.01)
(Continued)

(52) U.S. Cl.
CPC .............. *B23D 37/22* (2013.01); *B23B 27/06* (2013.01); *B23B 27/145* (2013.01);
(Continued)

(58) Field of Classification Search
CPC ... B23B 1/00; B23B 3/28; B23P 13/00; B23P 9/00; F16J 10/00; B21D 43/28
See application file for complete search history.

(56) References Cited

U.S. PATENT DOCUMENTS

| 4,792,265 A | 12/1988 | Rottler et al. |
|---|---|---|
| 5,380,564 A | 1/1995 | VanKuiken, Jr. et al. |

(Continued)

FOREIGN PATENT DOCUMENTS

| CH | 262604 | 7/1949 |
|---|---|---|
| DE | 42 14 355 | 11/1993 |

(Continued)

OTHER PUBLICATIONS http://www.tool-tool.com/aviation-dovetail.htm published 2003.*
(Continued)

*Primary Examiner* — Moshe Wilensky
(74) *Attorney, Agent, or Firm* — Burr & Brown, PLLC

(57) ABSTRACT

For producing a cylindrical surface that has a surface structure of predetermined geometry suitable for application of material by thermal spraying, a geometrically predetermined groove structure of minimal depth and width is introduced into the surface by a tool embodied as a follow-on tool in that a groove cross-section is processed successively to a final size. In order for the surface to be producible in mass production with constant quality, the groove structure is worked in such that first a base groove is introduced with a groove bottom width that is smaller than the groove bottom width of the finished groove. Subsequently, at least one flank of the base groove is processed for producing an undercut
(Continued)

groove profile by a non-cutting action or cutting action wherein the introduced groove structure is deformed in such a way that the groove openings are constricted by upsetting deformations of material.

57 Claims, 5 Drawing Sheets

(51) Int. Cl.

| | | |
|---|---|---|
| *B23B 27/14* | (2006.01) | |
| *B23B 29/034* | (2006.01) | |
| *B23B 41/12* | (2006.01) | |
| *B24B 33/08* | (2006.01) | |
| *C23C 4/02* | (2006.01) | |
| *B23C 5/20* | (2006.01) | |
| *B23D 37/00* | (2006.01) | |
| *B23D 37/16* | (2006.01) | |
| *B23D 43/00* | (2006.01) | |

(52) U.S. Cl.
CPC ........ *B23B 29/03428* (2013.01); *B23B 41/12* (2013.01); *B23C 5/207* (2013.01); *B23D 37/005* (2013.01); *B23D 37/16* (2013.01); *B23D 43/005* (2013.01); *B24B 33/08* (2013.01); *C23C 4/02* (2013.01); *B23B 2200/204* (2013.01); *B23B 2210/027* (2013.01); *B23B 2215/24* (2013.01); *B23B 2215/242* (2013.01); *B23B 2222/04* (2013.01); *B23B 2222/16* (2013.01); *B23B 2226/125* (2013.01); *B23B 2226/315* (2013.01); *B23B 2228/10* (2013.01); *B23C 2200/00* (2013.01); *B23C 2220/36* (2013.01); *Y10T 83/0304* (2015.04); *Y10T 83/9358* (2015.04); *Y10T 407/1906* (2015.01); *Y10T 407/23* (2015.01); *Y10T 409/400175* (2015.01)

(56) References Cited

U.S. PATENT DOCUMENTS

| | | |
|---|---|---|
| 5,622,753 A | 4/1997 | Shepley et al. |
| 5,931,038 A | 8/1999 | Higashi |
| 6,394,710 B1 | 5/2002 | Kurz |
| 7,220,458 B2 | 5/2007 | Hollis et al. |
| 2003/0223830 A1 | 12/2003 | Bryan et al. |
| 2004/0045419 A1 | 3/2004 | Bryan et al. |
| 2005/0044707 A1 | 3/2005 | Izquierdo et al. |
| 2005/0064146 A1 | 3/2005 | Hollis et al. |
| 2005/0064746 A1 | 3/2005 | Lin |
| 2005/0221057 A1 | 10/2005 | Hollis et al. |
| 2006/0263153 A1 | 11/2006 | Isaksson |
| 2008/0244891 A1 | 10/2008 | Iizumi et al. |
| 2009/0175571 A1 | 7/2009 | Boehm et al. |
| 2010/0326270 A1 | 12/2010 | Doerfler et al. |

FOREIGN PATENT DOCUMENTS

| | | |
|---|---|---|
| DE | 196 14 328 | 10/1997 |
| DE | 198 02 842 | 8/1998 |
| DE | 10 2007 023 418 | 11/2008 |
| DE | 10 2009 028 040 | 2/2011 |
| DE | 10 2009 027 200 | 4/2011 |
| EP | 0 989 197 | 3/2000 |
| EP | 1 225 324 | 7/2002 |
| EP | 2 112 359 | 10/2009 |
| WO | 96/33837 | 10/1996 |
| WO | 98/48964 | 11/1998 |
| WO | 2006/061695 | 6/2006 |
| WO | 2006/118505 | 11/2006 |
| WO | 2007/087989 | 8/2007 |
| WO | 2008/034419 | 3/2008 |

OTHER PUBLICATIONS

Kretzschmar, Eberhard: *Das Metallspritzverfahren und seine Anwendung in unserer Wirtschaft*, pp. 42-43, VEB Carl Marhold Verlag, Halle (Saale), 1953, 3 pages.

German Office Action from a corresponding German patent application dated Jan. 12, 2017, 8 pages.

\* cited by examiner

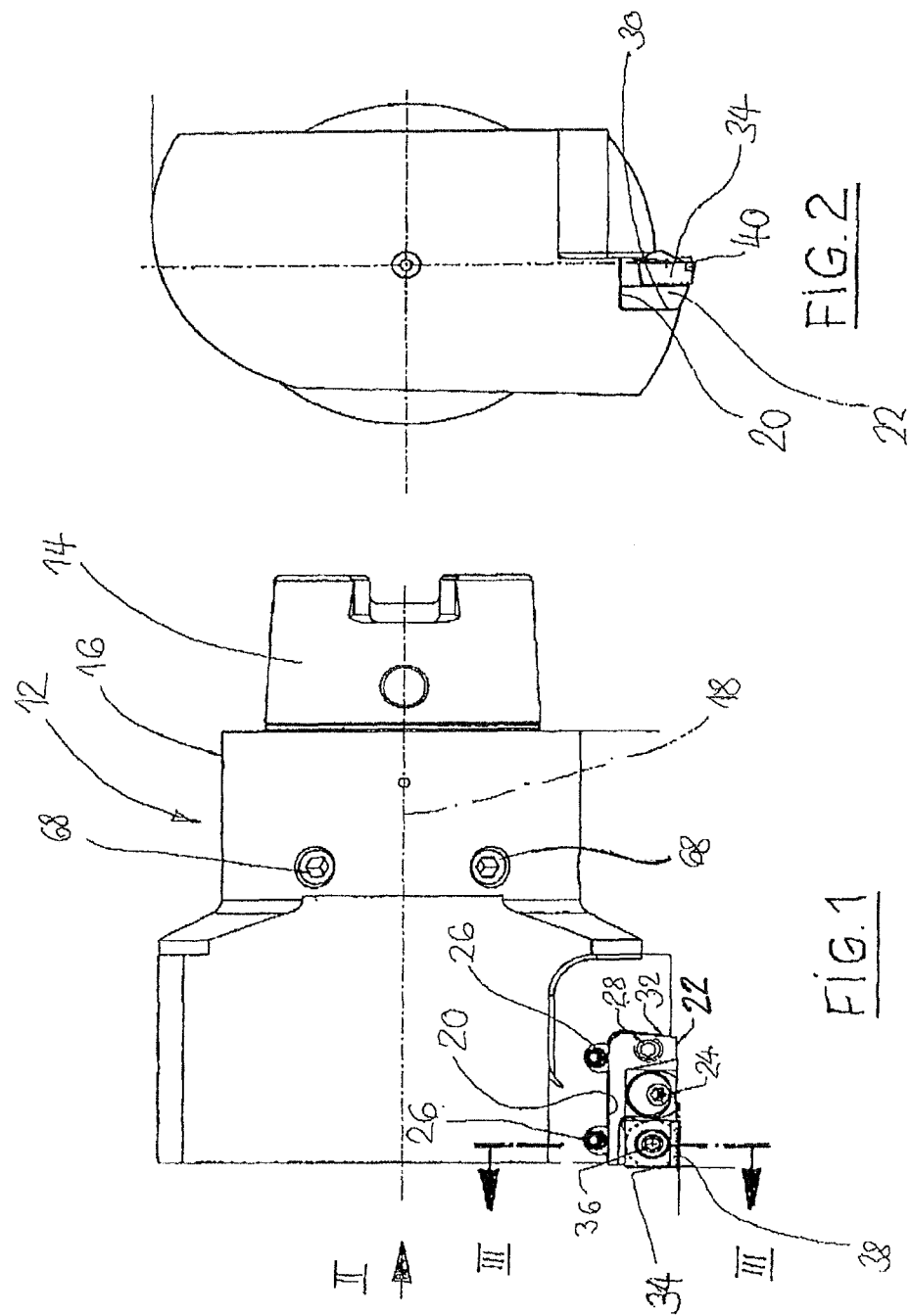

METHOD AND TOOL FOR PRODUCING A SURFACE OF PREDETERMINED ROUGHNESS

CROSS REFERENCE TO RELATED APPLICATION

This application is a division of U.S. application Ser. No. 12/362,528 filed Jan. 30, 2009 and claims the benefit of German Application No. 10 2008 036 454.1, filed Aug. 5, 2008, German Application No. 10 2008 046 944.0, filed Sep. 12, 2008 and German Application No. 10 2008 058 452.5, filed Nov. 21, 2008, the entireties of which are incorporated herein by reference.

BACKGROUND OF THE INVENTION

The invention concerns a method for producing a surface with predetermined roughness, in particular an e.g. cylindrical surface, that has a surface structure of predetermined geometry suitable for application of material by thermal spraying, in which a substrate surface, preferably premachined to size, a geometrically determined groove structure of minimal depth and width is introduced by means of a tool that is preferably embodied as a follow-on tool, in that a groove cross-section is processed successively to a finished size.

Moreover, the invention concerns a tool for performing such a method as well as a device for performing the manufacturing method. Components of this invention are thus moreover a suitable combination tool, including a honing tool, a manipulation device designed for handling it, as well as a mechanical processing method for a targeted and reproducible manufacture of a defined surface quality and surface geometry.

For solving certain technical problems, in particular tribological problems, it is often desired to coat surfaces of a support material with a material that has defined properties that are matched to the respective conditions of use. In comparison to solutions in which several components are joined either mechanically or by adhesive connections or brazing connection, such coatings have the advantage of an extremely compact construction combined with a relatively large contact surface of the adjoining materials so that such a joining technique is expedient in particular for thermally highly loaded components. By means of the coating an excellent material bonding results so that thermal energy can be dissipated particularly well.

In the field of metallic materials such coatings are often applied by so-called "thermal spraying" wherein, in addition to the so-called flame spraying, recently often the so-called plasma spraying process or arc spraying process has been used. In this connection, powder particles and/or wire particles are thrown or sprayed at high thermal and kinetic energy onto the surface of the substrate to be coated and form thereon, after temperature dissipation, the desired coating.

In addition to precisely maintaining process parameters for avoiding so-called coating porosities, i.e., incorporation of cavities that can no longer be filled or so-called "overspray" where a portion of the molten particles will not adhere to the substrate but will rebound, a decisive factor for a reliable utilization of this manufacturing process is the mechanical interlocking between coating and substrate in order to achieve a satisfactory high level of adhesion of the coating. In such a case there is the need to configure the substrate surface with a surface structure of predetermined geometry so that the layer will mechanically interlock uniformly across the entire surface to be coated. In this connection, it has been found that frequently it is not sufficient to roughen the substrate surface, for example, by sandblasting or waterjet blasting and/or to activate it.

When, for example, an engine block is provided with suitable coatings that are applied by thermal spraying, a wear-resistant and friction-reduced bearing surface is provided.

The applied matrix, for example, steel matrix, is subjected when in use to a significant mechanical loading so that for providing a satisfactory service life it is important to bond the coating strongly to the substrate, for example, in the form of cast aluminum. It is particularly important to process the surface of the material to be coated in such a way that a surface with precisely defined geometric parameters is produced that is particularly suitable for thermal spraying, wherein it must be ensured that the manufacturing process is designed such that the desired surface structure can be produced in a reproducible way with minimal variance in order to ensure satisfactory bonding.

In this connection, it has been considered to process by cutting the substrate surface, for example, of a cast aluminum part, by means of a follow-on tool in that a groove cross-section is successively machined to the final size with cutting teeth that engage sequentially. With currently embodied tools of this type it has been attempted to introduce structures into the premachined cylindrical surface, for example, of cast aluminum. However, in practice this proved to be problematic in that these structures cannot be introduced with constant quality and shaping into the substrate. The adhesion of the coating applied subsequently by thermal spraying varied within too wide a range. Up to now, it has therefore not been possible to employee this method for mass production.

SUMMARY OF THE INVENTION

The invention has therefore the object to further develop a method for producing an e.g. cylindrical surface with predetermined surface structure of the aforementioned kind in such a way that it is suitable for mass production of a substrate surface that is optimally prepared for thermal spraying. A further object resides in that a tool for performing the method is to be provided with which the substrate surface prepared in an optimal way for the application of a material by thermal spraying can be produced in a particularly economical, high-precision manner with minimal shape fluctuations.

Finally, an object of the invention resides in that a device is to be provided for performing the method by employing the tool according to the invention.

These objects are solved with regard to the method in that the groove structure is introduced into the e.g. cylindrical substrate surface in that first a base groove with a groove bottom width that is less than the groove bottom width of the finished groove is introduced into the substrate surface, and that subsequently the groove, for example, at least one flank of the base groove, is processed by a non-cutting action or a cutting action for producing the groove cross-section, in particular an undercut groove cross-section; with regard to the tool in that the tool comprises a support part on which at least one e.g. substantially parallelepipedal shaping and cutting plate is attached that has at least at one lateral edge, that can be aligned parallel to the cylindrical substrate surface to be processed, with at least three comb-like sequentially arranged teeth, of which a first tooth forms a premachining and safety tooth with a first tooth cross-section and a first projecting length, at least one second neighboring tooth forms a groove premachining tooth with a second tooth cross-section that is higher than the first cross-section and a second projecting length that is great than the first projecting length and at least one third tooth neighboring the second tooth forms a shaping tooth (for example, dovetail tooth) with a least one lateral slanted flank by which the tooth head is enlarged to a tooth width that is greater than the tooth width of the tooth that is previously in engagement; and with regard to the device in that the device comprises a tool support that has at least two degrees of freedom of movement, of which one is the advancing direction of the tool and/or of the workpiece parallel to the axis of rotation of the tool or the workpiece and the other determines the advancing direction extending at an angle thereto, wherein the advance can be adjusted to the relative rotary speed between tool and workpiece.

According to the invention, the groove structure in the substrate surface is produced in such a way that first a base groove with a groove bottom width that is smaller than a groove bottom width of the finished groove is worked or cut or shaped into a cylindrical substrate surface, for example. Only thereafter this base groove is further processed in a non-cutting or cutting way such that at least on one side or on one flank of the groove worked into the substrate a contour results that is optimally prepared for the future method step of thermal spraying. Preferably, the at least one flank of the groove is processed in such a way that an undercut or an undercut-like constriction of the groove worked into the surface is produced. As a result of the constriction of the grooves it is possible to provide between substrate and coating an extremely strong interlocking action. By this stepwise incorporation of the groove structure it can be ensured that the same forces will act on the teeth or cutting edges that will subsequently engage.

The tool can be designed according to an advantageous embodiment as a follow-on tool. Further advantageous embodiments are disclosed in the dependent claims.

It is particularly advantageous when the groove that has been produced by non-cutting action or cutting action is deformed in that the worked-in groove openings are constricted by upsetting deformations of material. Advantageously, this upsetting deformation of material can be generated simultaneously with the production of the groove contour and preferably with the same tool. In this way, a particularly effective undercut for creating a strong interlocking action of the spray-on layer to be applied with the cylindrical surface.

It has been found in experiments that this type of groove flank processing reliably ensures that with regard to the tool no so-called "smearing" occurs that, in particular when processing relatively soft materials, for example, aluminum, is responsible for shape imprecision of the groove structure to be produced. In this way, an undercut groove with a groove bottom width of up to 0.18 mm and a depth of approximately 0.14 mm with a groove pitch (groove coil pitch) of approximately 0.7 mm with constant groove geometry was produced on a cylindrical inner surface, wherein it was even achieved to limit the opening of the groove facing the material to be applied to a width of 0.12 mm. In this way, particularly beneficial conditions for the application of a material by thermal spraying are provided, for example, for plasma spraying and for arc spraying.

A particularly advantageous embodiment proposes that the groove is realized by a tool in one working step in different cutting and deformation operations, for example, by means of a follow-on tool, so that the desired surface structure can be produced with simplest kinematics and thus quickly and efficiently.

The stepwise processing according to the invention for forming the final groove shape makes it possible to optimize the surfaces of the groove structure, i.e., the groove flanks and/or the bottom of the groove(s), within wide limits in order to optimize the interlocking action between the substrate and the material to be applied. This is realized, for example, in that the processed surface, produced in that, for generating the groove cross-section, the cutting and deformation process is done such that during material removal the surface is roughened and a microstructuring and/or microundercut and/or microroughness is produced, is provided with a microstructure.

The tool according to the invention for performing the method is characterized in that the teeth of the e.g. parallelepipedal-shaped shaping and cutting plate that produce the groove structure have upstream thereof a preprocessing and safety tooth that has a reduced projecting length in comparison to the subsequent groove processing or shaping teeth. The preprocessing and safety tooth can therefore be used for guiding and stabilizing the shaping and cutting plate upon immersion into the cylindrical substrate surface. The teeth of the follow-on tool in this way will engage with great precision the substrate to be processed. As a result of the stepwise introduction of the groove structure, it is also possible to ensure that constant forces will occur at the teeth or cutting edges that engage subsequently. This not only improves the precision of the groove structure to be produced but also improves the control of loading of the very small teeth of the tool. A tool of such a configuration thus no longer tends to produce the aforementioned "smearing", in particular, in connection with minimal quantity lubrication (MQL), in the area of the fine toothing so that for the first time it has been achieved that the desired micro-groove structure can be mass-produced with narrow tolerance geometry.

Advantageous further embodiments of the method and the tool are subject matter of the dependent claims.

In principle, the method according to the invention can be applied for any surface structures of the substrate to be coated. A particularly powerful embodiment of the method results however when the surface to be coated is a cylindrical substrate surface. In this case, the groove structure can be produced in that at least one coil-shaped groove is worked into the cylindrical substrate surface in that a tool is being used that—similar to a tapping tool—supports comb-like and redundant, sequentially arranged teeth of different cross-section that successively process one and the same groove. In this connection, it can be advantageous to shape or impress the base groove into the cylindrical substrate surface. However, it is also possible as well to produce a base groove by cutting action.

The afore described groove structure is to be configured for preparation of thermal spraying in such a way that the grooves have a very small depth and width. Accordingly, the tool for producing the groove structure must be designed to have a delicate configuration. When accordingly the method is further developed in that the groove structure is produced in that at least one coil-shaped groove is introduced into the cylindrical surface, a single shaping and cutting part furnished with teeth arranged in a comb-like arrangement is sufficient for producing the groove structure. However, it is also possible to produce in the surface a multi-start base groove as well as several grooves with undercut groove cross-section. Because the processing or cutting work steps are carried out redundantly, the special advantage results that even for tool wear a uniform groove geometry can be produced.

When the method step of incorporating the base groove and/or the finished groove structure (cutting and deformation operations) is divided into partial steps, the forces acting on the teeth of the tool can be controlled even better. Because the working or cutting processing steps are thus performed redundantly, the special advantage results that even when the tool is worn a uniform groove geometry can still produced.

An especially advantageous substrate surface that has an optimal structure for the subsequent application of a material by thermal spraying results when in the cylindrical surface between the at least one groove generated previously with the same tool an intermediate groove is formed so that undercut-like material deformations in the previously produced groove structure are generated. As a result of plastic forming, i.e., displacement of substrate in the substrate surface to be provided with the groove structure, not only an intermediate groove is produced that increases the contact surface between the substrate and the material to be applied by thermal spraying. Moreover, the displacement of the substrate material between the depressions of the groove causes a sufficient narrowing of the groove opening so that the sprayed-on layer will interlock particularly effectively and intensively with the substrate material.

The tool can be embodied purely as a forming, cutting or honing tool or also as a tool that combines different processing methods, for example, cutting and forming or honing and forming or cutting and honing. For example, it can also be advantageous to utilize the tool configuration of a honing tool, for example, a cylinder hone, with radially adjustable tool inserts by employing an expander cone for positioning the cutting edges. In the embodiment as a honing tool preferably several cutter parts, such as honing stones, are distributed uniformly about the circumference and serve as supports for an abrasive material, i.e., abrasive grain, that is advantageously comprised of diamond (PCD) or boron nitride or other comparable shape-stable materials. The abrasive grain that projects from the bonding material (ceramic, metallic, or synthetic resin) has in this case additionally a predetermined geometry that changes in a predetermined way across the axial length of the honing stone so that with adjustment of the axial advancing movement to the relative rotational movement between honing stone and substrate the above described step-wise working of the defined groove structure is possible.

According to a variant it can also be provided to subject the honing stone during the axial relative movement relative to the substrate surface to a radial advancing movement so that the grooves that have been produced by a leading section of the honing stone(s) are gradually ground to full depth.

With a tool configuration according to the example of a honing tool the grooves are therefore steeper and they can even intersect, as a result of the normally provided reciprocating movement of the honing tool. It is even possible in principle to design the honing stones such that displacement projections follow the abrasive grain in a predetermined position that is matched to the kinematics of the honing process so that in this connection the aforementioned undercut-like groove can be produced by material displacement.

It has been proven in experiments that the most important parameter for excellent and permanent adhesion of a layer applied by thermal spraying is the mechanical interlocking between layer and substrate. According to the embodiment of the method, wherein in the cylindrical surface between the at least one groove generated previously with the same tool an intermediate groove is formed so that undercut-like material deformations in the previously produced groove structure are generated, or the embodiment of the tool, wherein adjacent to the at least one shaping tooth embodied e.g. as a dovetail tooth on the side facing away from the safety tooth additionally a displacement tooth is formed that has across a predetermined length a projecting length corresponding to that of the safety tooth and preferably has at its center section a preferably rounded projection, this mechanical interlocking can be ensured even when the at least one flank of the groove worked into the substrate surface is undercut only slightly or not at all.

The embodiments of the tool for performing the method ensure that the tool and particularly the parallelepipedal shaping and cutting plate that is employed are provided with a particularly long tool life travel. When, for example, a tool is provided with several preferably neighboring shaping teeth with which different flanks of the e.g. undercut groove to be formed can be processed, the several preferably adjacently positioned cutting and impressing teeth cause the forming action and sequentially different flanks of the groove to be formed, for example, with undercuts, can be processed, so that reduced cutting forces at the individual teeth and thus greater service life of the tool will result.

In the embodiment wherein tool is characterized in that, adjacent to the at least one shaping tooth embodied e.g. as a dovetail tooth on the side facing away from the safety tooth, additionally a displacement tooth is formed that has across a predetermined length a projecting length corresponding to that of the safety tooth and preferably has at its center section a preferably rounded projection, the tool becomes a cutting and forming tool. With an appropriate configuration of the displacement tooth, i.e., by providing the displacement tooth across a predetermined length with a projecting length matching that of the safety tooth, the material that is displaced by the rounded projection is displaced mandatorily toward the cut groove so that the groove opening that is facing the material to be applied is additionally constricted. The projecting length of the displacement tooth and thus the projecting length of the safety tooth is selected preferably such that the forming and cutting plate can be introduced with clearance fit or slight press fit into the prepared bore, i.e., into the prepared substrate bore. Preferably, the safety tooth has a width that is a multiple of the width of the least one groove premachining tooth or the at least one shaping tooth (for example, dovetail tooth). In this way, the guiding action of the shaping and cutting plate and thus the working precision of the tool is further improved.

As already mentioned above, for producing the groove structure with exactly predetermined geometry it is important to introduce the groove or grooves with highest precision in such a way that even after long tool life travel of the shaping and cutting plate no uncontrolled substrate deposits between the teeth, i.e., no so-called "smearing", will result, which in particular for processing relatively soft materials such as aluminum can result in greater fluctuations of the formed groove geometry and in shape deviations. It has been found that in particular for a tool configuration wherein the shaping teeth are comprised of wear-resistant material, preferably, steel or hard material, or wherein the shaping teeth are formed in a cutting insert that has the shape of a prism block or parallelepipedal block and is comprised of a composite part in which a hard material, for example, PCD plate, is seated on a support comprised e.g. of hard metal, preferably attached by brazing, wherein the shaping teeth extend across the separating plane of the two materials, it can be reliably achieved that the groove structure is mass-produced with constant quality while long tool life travel of the tool is ensured.

When the cutting insert is formed by a composite part in which a hard material plate, in particular of polycrystalline diamond (PCD), is seated on a support part, preferably a hard metal support, the teeth can be configured to be very delicate with greatest possible precision so that optimal cutting conditions are provided in particular where smallest chip volumes or chip cross-sections occur. Still, the tool is highly loadable because the support or hard metal support that supports the hard material or PCD plate imparts to the tool the required stability, rigidity, and resilience. Preferably, the teeth are eroded into the composite plate. In this way, it is possible without problems to configure the shaping teeth to extend across the separating plane between hard metal support and PCD plate in a continuous way.

In the embodiment wherein the cutting insert is secured positively in a cutting plate that is embodied, e.g., as an indexable insert, preferably is brazed, or wherein the cutting plate is supported by a holder that is seated adjustably on a tool module in such a way that the cutting insert can be aligned substantially parallel to the axis of the circular-cylindrical surface to be processed, an advantageous fine adjustability of the shaping teeth is provided so that it is possible to distribute the loads onto the teeth machined with high precision as uniformly as possible.

BRIEF DESCRIPTION OF THE DRAWINGS

In the following with the aid of schematic drawings several embodiments of invention will be explained in more detail. It is shown in:

FIG. 1 a side view of a first embodiment of the tool for producing a cylindrical inner surface that has a surface structure of predetermined geometry prepared for application of material by thermal spraying;

FIG. 2 an end view of the tool according to FIG. 1 according to "II" in FIG. 1;

DESCRIPTION OF THE PREFERRED EMBODIMENTS

Figure 4:
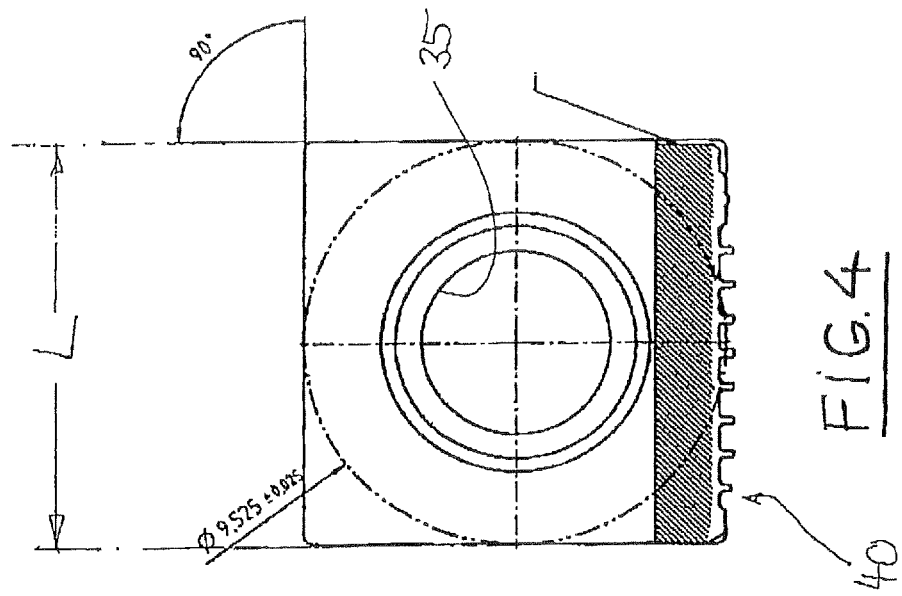
FIG. 4 the plan view of the indexable insert according to "IV" of FIG. 3.

In the following a tool will be described with which a cylindrical inner surface of a substrate, in particular a bore of an engine block that has been prepared to size or premachined can be worked in such a way that a layer can be applied by a thermal spraying method in mass production. By means of this material application by so-called thermal spraying a liner, for example, of steel with traces of other elements, is to be produced, in particular in the form of a matrix with embedded oxide nests and very fine pores. The finished thickness of this layer should then be approximately 0.1 to 0.2 mm wherein after honing this layer exhibits a very smooth surface with very fine pores.

In order for the material applied by thermal spraying to adhere well on the substrate, i.e., a cast aluminum material, it is required to provide the substrate with a special surface so that interlocking between the material layer applied by thermal spraying and the cast aluminum can be realized across the entire substrate surface in a reproducible way and with constant excellent quality. The cylindrical inner surface of the cast aluminum substrate, for example, in case of producing cylinder liners of internal combustion engines, has an axial length of approximately 130 mm and extremely tight cylinder shape tolerances and surface roughness must be complied with. The tool according to the invention is configured such that it produces in the already very precisely premachined cylindrical substrate surface at least one coil-shaped groove with predetermined geometry; this will be explained in the following in more detail.

The entire tool is illustrated in FIG. 1 and referenced by reference numeral 12. It comprises a clamping shaft 14 with a hollow shaft taper (HSK) adjoined by a base member 16. The axis of the tool 12 is identified at 18 and it can be seen in this illustration that the tool 12 is an extremely rigid and shape-stable tool which is a prerequisite for being able to machine a cylindrical inner surface of the cast aluminum with the predetermined cylinder shape precision.

In a pocket referenced at 20 there is a tool holder 22 that is substantially in the shape of a parallelepiped and by means of a clamping screw 24 can be clamped against two inner surfaces of the pocket 20 positioned at an angle to one another. The reference numeral 26 identifies eccentric pins that, by means of suitable tools, for example, a hexagon socket wrench, can be turned in order to align the holder 22 relative to the axis 18. It is understood that therefore the clamping screw 24 penetrates a corresponding bore in the holder with play and at an angle to the two contact surfaces of the pocket 20 so that such fine adjustments of the tool holder 22 are possible.

With reference numeral 28 a threaded pin is identified which, not illustrated in detail, is supported on a support surface 30 of the pocket 20 so that the holder 22 with contact on the radially inwardly positioned support surface of the pocket 20 is pivotable in a plane parallel to the axis 18.

It can also be provided that the holder 22 is secured so as to be adjustable in axial direction, preferably fine-adjustable, by means of an adjusting bolt, not illustrated in detail, that is in contact with an end face 32 of the holder 22 and is pressed or screwed substantially radially into the base body 16.

The tool holder 22 supports the indexable insert 34 that, by means of a central fastening screw 36 interacting with a penetration 35 of the indexable insert, is secured in a detachable way on the tool holder 22.

The indexable insert 34 is comprised of a suitable support material, for example, steel, in particular tool steel. However, it supports on one lateral edge 38, that is parallel to the tool axis 18 and thus to the cylindrical substrate surface, a cutting insert 40 that substantially extends across the entire length of the indexable insert 34. For describing the details reference is being had in the following to FIGS. 3 and 4.

Figure 3:
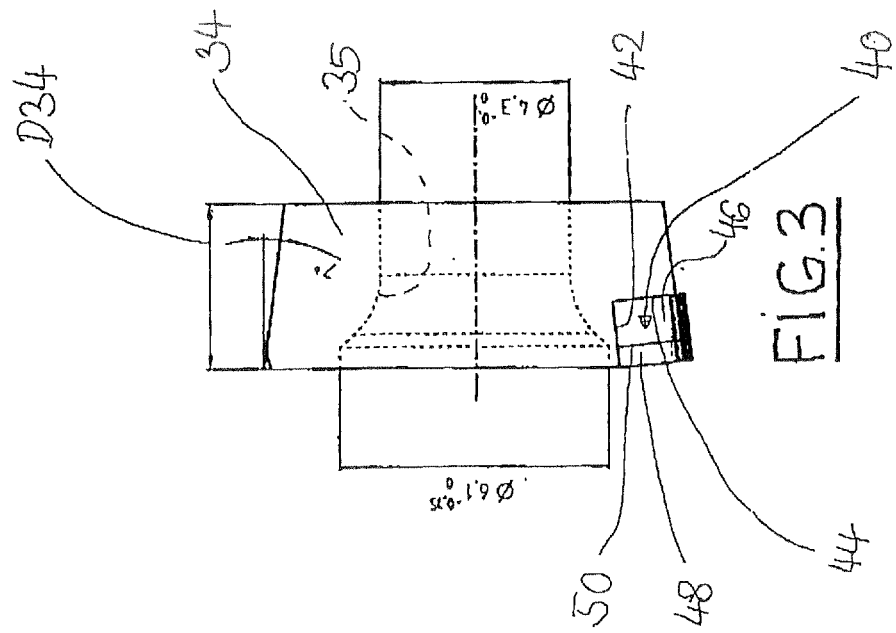
FIG. 3 on a greatly enlarged scale the section according to "III-III" through a indexable insert that is provided with cutting insert for producing the surface structure.
Figure 5:
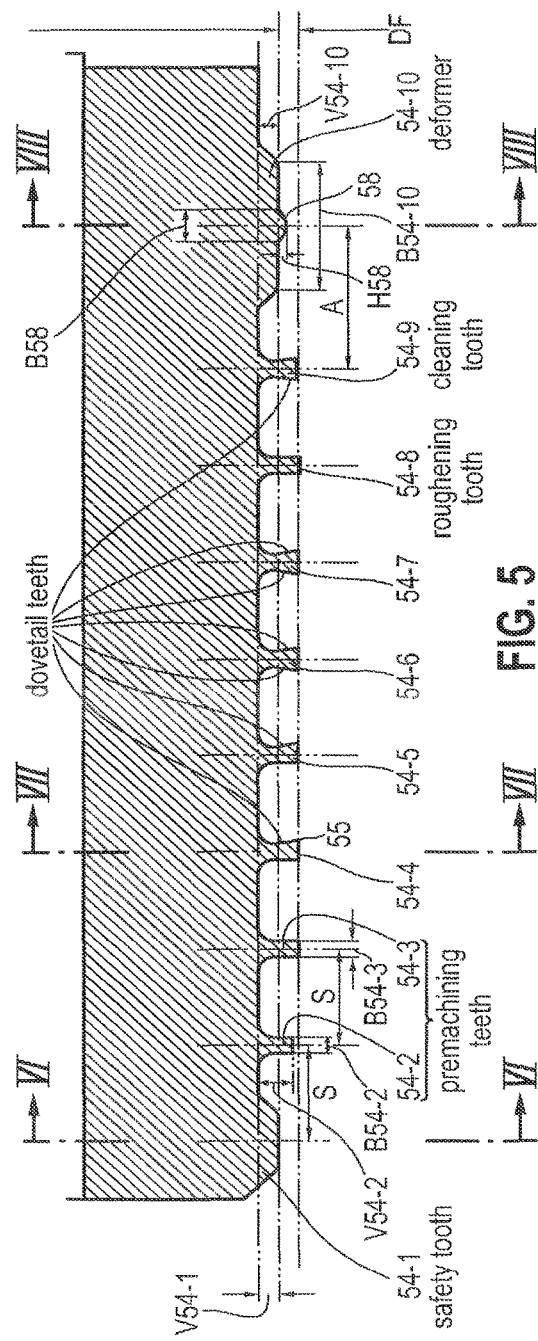
FIG. 5 on a greatly enlarged scale the plan view of the cutting insert of the embodiment according to FIG. 4.

It can be seen that the indexable insert 34 in the area of the lateral edge 38 has a recess delimited by two surfaces 42, 44 positioned at a right angle to one another, into which, preferably by brazing, the cutting insert 40 in the form of a parallelepiped with substantially square cross-section is fixedly inserted. FIGS. 3 and 4 show the indexable insert with cutting insert on a greatly enlarged scale. The illustration however shows that the indexable insert 34 only has a thickness D34 of approximately 4 mm and an edge length of approximately 9.5 mm. Accordingly, the cross-section of the cutting insert 40 is accordingly small with an edge length of approximately 1.1 mm.

The cutting insert 40 is a composite part wherein a cutting plate 48 of polycrystalline diamond (PCD) is fixedly seated on a hard metal support 46. The connection between the parts 46 and 48 is realized by means of brazing. The planar separating plane between the hard metal support 46 and the cutting plate 48 or the PCD cutting plate 48 is identified by reference numeral 50.

In particular the illustration of FIG. 4 shows that the PCD cutting plate 48 is shorter by a size K then the cutting edge length of the hard metal support 46 so that in this way it is possible to eliminate the risk of damage in regard to the relatively brittle PCD cutting plate 48. In FIG. 4 the PCD cutting plate is indicated by cross-hatching.

Moreover, it can be seen that the cutting insert 40 is provided with an extremely delicate toothing that makes it possible to work a groove structure with precisely predetermined geometry, for example, into a cylindrical surface of a cast aluminum part with any diameter, for example, the bore diameter of an internal combustion engine cylinder. In this connection, at least one groove is to be produced that extends like a thread across the entire axial length of the cylindrical substrate surface and has, for example, a depth T (see FIG. 10) of less than 0.15 mm and a width B in the range of maximally 0.2 mm. The pitch S of the groove 52 (see FIG. 10) is approximately 0.5 to 0.8 mm.

For producing this groove 52 with a geometry according to FIG. 10 the cutting insert 40 is provided with a special toothing that will be explained in the following with reference to FIGS. 5 to 8 in more detail.

FIGS. 5 to 8 show the plan view and section illustrations of the cutting insert 40 at a greatly enlarged scale. The total length L of the cutting insert 40 is approximately 9 to 10 mm. The width B40 of the cutting insert 40 is approximately 1 mm, likewise the entire height H40. One can see in the illustrations according to FIGS. 6 to 8 that the PCD cutting plate 48 only has a thickness H48 of approximately 0.3 to 0.4 mm while the hard metal support 46 has a thickness H46 between 0.6 and 0.7 mm. The teeth identified by reference numerals 54-1 to 54-10 are preferably eroded into the lateral surface of the cutting insert 40 across its entire height with the following geometry.

At the axially leading end area there is first a safety tooth 54-1 that projects by a height V54-1 from the tooth root surface. The height V54-1 is selected such that the tooth head of the safety tooth 54-1 for a finish-adjusted tool holder 22 is substantially positioned at the cylinder running surface diameter, i.e., the premachined inner diameter of the substrate to be coated. The width B54-1 of the safety tooth is approximately 0.3 mm.

Adjacent to the safety tooth 54-1 there follow at a spacing of the pitch S, respectively, two premachining teeth 54-2 and 54-3. The premachining tooth 54-2 has a substantially narrower tooth cross-section that however projects at a greater projecting length V54-2 from the edge of the cutting insert 40. In other words, the first premachining tooth 54-2 emerges by the predetermined length into the prepared substrate surface and generates a base groove that is indicated in FIG. 10 in dash-dotted line 52B.

Figure 10:
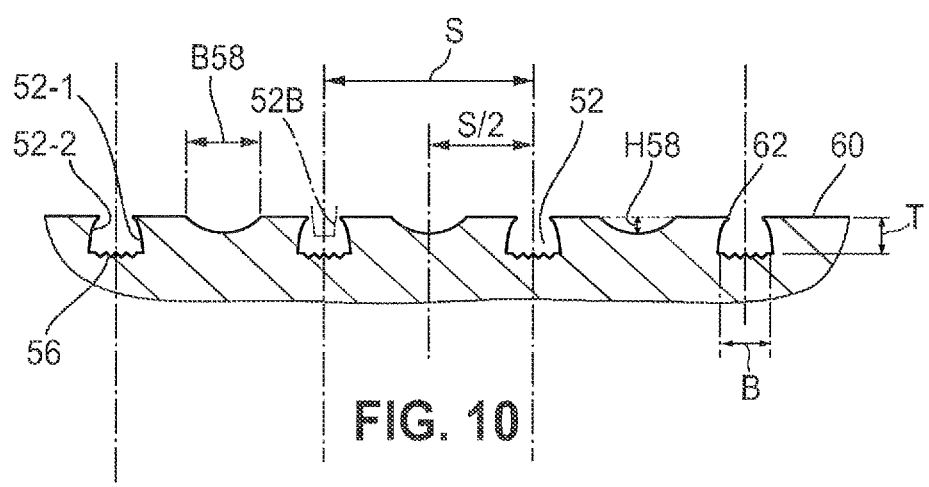
FIG. 10 is a greatly enlarged illustration a part-sectional view of the substrate surface structure producible with the described tool.
Figure 10A:
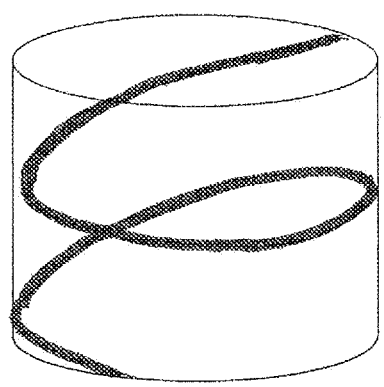
FIG. 10a shows a purely schematically a coil-shaped groove in a cylindrical surface.

The shape of the first premachining tooth 54-2 is however such that the width B54-2 of the tooth head is smaller than the width B of the finished groove 52 (compare FIG. 10). Also, the projecting length V54-2 is selected such that it not yet reaches the diameter DF of the finished contour of the groove 52. Only by means of the second premachining tooth 54-3 the base groove is cut to the full depth T (compare FIG. 10) wherein however the width of the groove is substantially kept at the size B54-2 of the first premachining tooth 54-2.

Each displaced by the pitch S of the groove 52 to be produced, so-called shaping teeth follow that in the following are referred to as "dovetail teeth" 54-4 to 54-7. However, it should be noted that these shaping teeth must not mandatorily have a flank that upon immersion into the substrate generate an undercut groove. The shaping teeth can moreover work by cutting action as well as in a non-cutting action.

In the illustrated embodiment the dovetail teeth 54-4 to 54-7 widen the previously formed base groove in the area of the groove bottom successively to the final size B (see FIG. 10). In this connection, the dovetail teeth 54-4 and 54-5 shape, i.e., cut, the groove at one flank to an undercut groove shape while the following dovetail teeth 54-6 and 54-7 form the other flank of the groove in that they carry out a cutting operation. After engagement of the last dovetail tooth 54-7 an undercut groove 52 with a contour according to FIG. 10 is present, i.e., with a depth T and a width B at the groove bottom. Instead of the cutting operation it is also possible to perform a non-cutting shaping by shaping teeth.

Again displaced by groove pitch S a so-called roughening tooth 54-8 follows the last shaping tooth or dovetail tooth 54-7 and generates with its tooth head a ribbing structure, i.e., a roughened structure 56 with a defined groove depth within the range of 1/100th mm.

A so-called cleaning tooth follows the roughening tooth 54-8, or a further displacement tooth 54-10 to be described infra, and removes possibly present chips in the cut groove. The cleaning tooth is referenced with the reference numeral 54-9 and has a tooth height that is less than the tooth height of the shaping teeth 54-4 to 54-6 so that the roughened structure 56 will not be contacted.

The row of the arranged teeth 54-1 to 54-9 is completed by a so-called displacement tooth 54-10. This tooth has a tooth head width B54-10 that is a multiple of the width of the premachining or shaping teeth. Preferably at the center of the displacement tooth 54-10 with projecting length V54-10, corresponding substantially to the projecting length V54-1 of the safety tooth 54-1, the displacement tooth 54-10 forms a rounded projection 58 that, for example, has a width B58 of approximately 0.1 mm and a height H58 of approximately 0.05 mm. Since the tooth height V54-10 of the displacement tooth 54-10 is selected such that it contacts more or less the inner surface of the substrate premachined to size, the displacement tooth 54-10 displaces with its projection 58 the relatively soft material of the substrate, for example, the material of cast aluminum, in a lateral direction so that the undercut groove 52 in the area of the transition into the inner surface 60 is further constricted by upsetting deformations 62 of material. Moreover, the displacement tooth ensures a reproducible and wear-compensating roughening depth.

As can be taken from the preceding description, the projection 58 is positioned at axial spacing A to the cleaning tooth 54-9 which spacing differs from the groove pitch S. For example, it is 1.5 times the groove pitch S.

Figure 8:
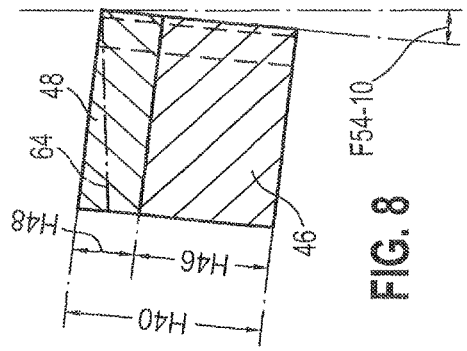
FIG. 8 the section according to "VIII-VIII" of FIG. 5.
Figure 7:
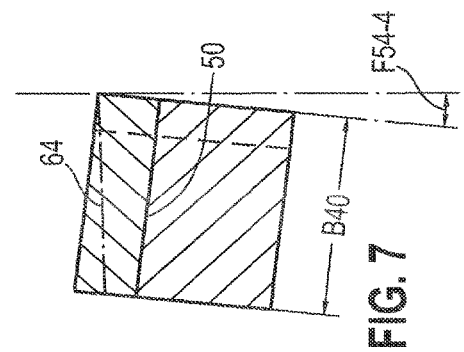
FIG. 7 the section according to "VII-VII" of FIG. 5.
Figure 6:
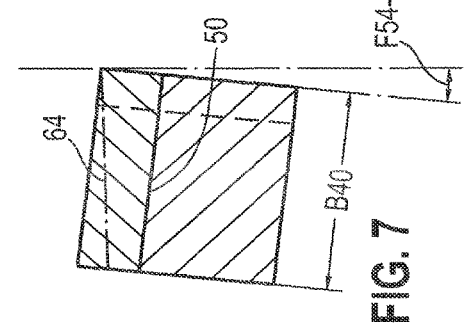
FIG. 6 the section according to "VI-VI" in FIG. 5.

From the section illustrations of FIGS. 6 to 8 it can be taken that the teeth 54-1 to 54-10 engage the substrate. It can be seen e.g. in FIG. 6 that the relief angle F54-1 of the safety tooth 54-1 has a value that is slightly above 0 degrees. It can even be negative. The relief angle F54-4 is definitely positive when the shaping teeth process the inner surface of the substrate by a cutting operation. Likewise, the rake angle of the premachining teeth, of the roughening tooth 54-8 and of the cleaning tooth 54-9 is then also positive. In contrast to this, the relief angle F54-10 of the displacement tooth 54-10, in particular in the area of the projection 58 is significantly smaller. It can even be negative so that the displacement tooth 54-10 with the projection 58 will not cut but will displace or deform material of the substrate.

Furthermore, it can be seen in the illustrations according to FIGS. 6 to 8 that the wedge angle of the cutting insert 40 is substantially 90 degrees so that in the illustrated embodiment a slightly negative rake angle results.

As can be seen moreover in the illustrations according to FIGS. 6 to 8, the teeth 54-2 to 54-9 are machined into the cutting insert 40, i.e., into the hard metal support with brazed-on PCD cutting plate, preferably by erosion, so that across the entire height H40 a uniform tooth height results. However, this does not apply to the tooth configurations in the area of the safety tooth 54-1 and of the displacement tooth 54-10 where the tooth height slightly increases with increasing spacing from the cutting edge corner.

With the afore described configuration of the tool the following action results for generating the cylindrical inner surface with predetermined surface structure.

The tool 12 is aligned with its axis 18 concentrically to the axis of the premachined cylinder running surface so that the radial spacing of the tooth head of the safety tooth 54-1 corresponds substantially to half the cylinder running surface diameter of the substrate surface. When the holder 22 has been aligned prior to this by means of the adjusting possibilities (eccentric pins 26, threaded pin 28) such that the tooth heads of the shaping teeth 54-4 to 54-7 are substantially parallel to the tool axis 18 in such a way that the tooth line is perpendicular to the coil-shaped groove to be produced, the tool can be moved into the inner bore. Subsequently, a relative rotational movement between the tool 12 and the substrate cylinder surface is generated and at the same time an axial relative displacement between tool 12 and substrate in such a way that the following applies:

$$V_R = n_R \times S$$

wherein $V_R$ is the axial relative speed between the tool 12 and the substrate and $n_R$ is the relative rotary speed between tool and substrate.

Supra, the tool or the toothing of the tool has been described in the area of cutting insert 14 in an embodiment in which the teeth have the same cross-section across the entire height H40 of the cutting insert 40. However it should already be mentioned at this point that the this is not mandatory. It is instead also possible to undercut the teeth, in particular the premachining teeth 54-2 and 54-3 as well as the shaping teeth 54-5 to 54-8, at least in the area of the leading flank in such a way that a positive lateral rake angle for cutting of the groove profile is provided.

As soon as the premachining tooth 54-2 has cut or shaped the base groove with groove bottom B54-2, the additional premachining tooth 54-3 begins to work which machines or cuts the base groove to the full depth T. The premachining tooth 54-3 can be omitted so that the first shaping tooth 54-4 will begin to work. This first shaping tooth 54-4 cuts a first undercut flank 52-1 in such a way that a somewhat wider groove bottom results. This groove bottom is recut by the second shaping tooth 54-5 so that the groove bottom on one side has been cut to full width B/2. Subsequently, the shaping teeth 54-6 and 54-7 complete by stepwise cutting the other undercut flank 52-2 and subsequently the roughening tooth 54-8 produces the roughened section 56.

In the afore described embodiment the premachining tooth 54-2 as well as the premachining tooth 54-3 are embodied as a combination tooth that cuts as well as produces roughness. It is however also possible to design the premachining teeth 54-2 and 54-3 as shaping and deforming teeth, i.e., as teeth that only displace the soft material of the substrate.

The embodiment according to FIGS. 1 through 8 shows the insert of the cutting insert part 40 in a rectangular recess (FIG. 3) with the surfaces 42 and 44 that are oriented such that for a parallelepipedal design of the cutting insert 40 a negative rake angle results. The dash-dotted line 64 therefore indicates in FIGS. 6-8 a surface that is produced when the topside of the cutting insert 40 is removed at a slant to the hard metal support 46 so that a positive rake angle is formed.

Figure 9:
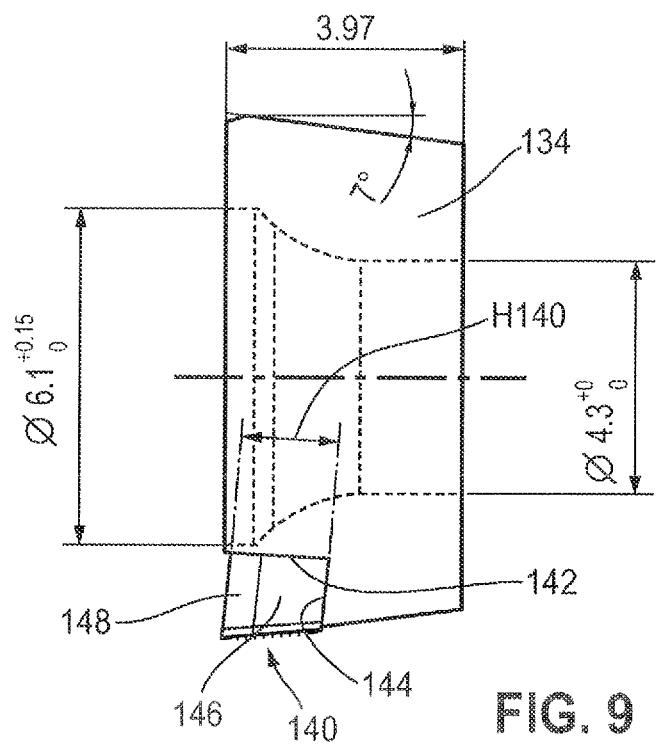
FIG. 9 in a view similar to FIG. 3 a further embodiment of the indexable insert with a modified cutting insert.

FIG. 9 shows a variant of the tool, more precisely of the indexable insert with brazed-on cutting insert in which a wedge angle smaller than 90 degrees with positive rake angle and positive wedge angle can be achieved even when the hard metal support as well as the PCD cutting plate have plane-parallel edge surfaces which ensures a simplified manufacture. For simplifying the description, those components that corresponds to the elements of the afore described embodiment are provided with similar reference numerals that however have a "1" placed in front.

It can be seen that the indexable insert 134 has a differently oriented recess for the cutting insert 140. The surfaces 142 and 144 are still positioned at a right angle to one another but the bottom surface 144 is slanted in opposite direction relative to the bottom surface 44 of the embodiment according to FIG. 3. When accordingly from a parallelepipedal cutting insert 140 with hard metal support 146 and PCD cutting plate attached thereto by brazing and with an edge length H140 a toothing is produced by erosion with the geometry according to FIG. 5, with simple manufacturing-technological measures in the area of the premachining teeth and the shaping teeth a positive relief angle can be produced while in the area of the safety tooth and of the displacing tooth by corresponding control of the erosion tool a reduced relief angle or a negative relief angle can be realized.

It has been demonstrated by large scale experiments that a tool constructed in accordance with the aforementioned criteria was able to introduce reproducibly a groove structure with the geometry according to FIG. 10 in the premachined cylindrical inner surface of cast aluminum wherein even after long tool life travel of the tool no aluminum smearing resulted. In this way, on the inner surface of the cast aluminum substrate a surface was produced that was excellently suitable for application of a sprayed-on layer.

It has been found to be decisive in this connection that the cutting insert embodied as a follow-on tool can be very precisely machined and as a result of the composite configuration is imparted with an improved stability at the important locations so that the cutting edges work exactly and reliably for a long period of time. As a result of the combination of the cutting and impressing teeth the undercut of the groove 52 can moreover be significantly enhanced so that the mechanical interlocking or engagement between the applied material and the aluminum substrate is significantly improved.

Of course, deviations of the afore described examples are possible without deviating from the principal ideas of the invention. For example, instead of the hard material PCD also another hard material, for example, cubic boron nitride (CBN) or also CVD diamond can be employed. It would also be possible in the area of cutting edges to work with different hard materials, for example, cermet materials.

The invention is also not limited to providing a cylindrical inner surface with a groove structure of predetermined geometry. In the same way, an outer surface or even a planar surface can be provided with a corresponding groove structure wherein a method as afore described can be used. The tool in this case would be embodied as a planing or broaching tool in which the teeth will machine sequentially the groove to the full cross-section like a follow-on tool.

The afore described tool has teeth that extends substantially in the circumferential direction, i.e., the cutting insert 40 is provided with straight toothing. It is also possible to provide the teeth so as to be slightly slanted.

In deviation from the afore described embodiment it is also conceivable to furnish the tool 12 with several cutting inserts that are distributed about the circumference; in this case the grooves could then be introduced like a multi-start thread into the substrate, i.e., shaped or cut. This modification of the tool leads to a kind of honing tool wherein the honing stones, that can extend across a significant length or across the entire length of the surface to be machined, are to be provided with a suitable geometry for producing the groove structure.

The tool can also be embodied purely as a shaping, cutting or honing tool or also as tool that combines the different machining types, for example, cutting and shaping and/or honing and shaping and/or cutting and honing. It can also be advantageous to utilize the tool configuration of a honing tool, for example, a cylinder hone, with radially adjustable tool inserts with the aid of an expander cone for positioning the cutting edges.

In regard to the configuration of the honing tool, preferably several cutting parts distributed uniformly about the circumference, for example, honing stones, are used that serve as a support for an abrasive material, i.e., abrasive grain, that preferably is comprised of diamond (PCD) or boron nitride or other comparable shape-stable materials. The abrasive grain that projects from the bonding material (ceramic, metallic or synthetic resin) is provided in this case additionally with a predetermined geometry or spatial shaping that in a predetermined way changes such across the axial length of the honing stone that by adjusting the axial advancing movement to the relative rotational movement between honing stone and substrate the above described stepwise or gradual incorporation of the defined groove structure is enabled. The envelope of the abrasive material in this case is a conical wall so that the leading abrasive grains in the advancing direction project less from the bonding material than the following abrasive grains. When the honing stones perform an axial reciprocating movement this envelope is in the form of a double cone that tapers in both axial directions away from the axial center.

According to a variant it can also be provided that the honing stone during the axial relative movement relative to the substrate surface is subjected to a radial advancing movement so that the grooves that are introduced by the leading section of the honing stone(s) are ground gradually to full depth. In this case, the envelope of the abrasive material can be in the form of a cylinder wall.

In a tool construction according to the embodiment of a honing tool the grooves become steeper and they can also intersect, as a result of the normally provided reciprocating movement of the honing tool. It is even principally possible to design the honing stones in such a way that displacement projections are arranged behind the abrasive grains in predetermined positional relation matched to the kinematics of the honing process so that also the undercut-like groove constriction that has been explained in connection with the method wherein the worked-in groove structure is deformed in such a way that the groove openings are constricted by upsetting deformation of material can be achieved by material displacement.

When the tool according to FIG. 1 is furnished with a single indexable insert, it can be advantageous to provide the base body 16 with guide ledges distributed about the circumference that ensure that the tool in cooperation with the safety tooth is guided safely in the substrate bore.

In order not to impair the required shape precision of the cylinder, FIG. 1 shows two balancing screws referenced by reference numeral 68 with which a fine balancing of the tool is possible.

In a further modification of the afore described tool it is also possible to impress the groove as a whole, i.e., also the area of the undercut flanks.

The invention therefore provides a method for producing a preferably cylindrical surface that has a surface structure of predetermined geometry suitable for application of material by thermal spraying. In this connection, a geometrically determined groove structure of minimal depth and width is introduced into a preferably cylindrical surface of a substrate to be coated that has been preferably premachined to size in that a groove cross-section is successively processed to the final size. This processing is done according for example by a follow-on tool. In order for the surface to be producible in mass production with constant quality, the method is design such that the groove structure is worked in such that first a base groove with a groove bottom width is introduced that is less than the groove bottom width of the finished groove. Subsequently, the groove, for example, at least one of the flanks of the base groove, is processed for producing an undercut groove profile by a non-cutting action or a cutting action, wherein preferably the worked-in groove structure is deformed in such a way that the groove openings are constricted by upsetting deformation of material.

The invention claimed is:
1. A device, comprising:
a tool; and
a cutting insert comprising a first portion and a second portion, the first portion comprising a base plate mounted to the tool, the second portion comprising cutting teeth that each comprise a proximal end and a distal end, each proximal end of each cutting tooth being attached to the base plate,
the cutting insert mounted on the tool,
the tool configured to rotate the cutting insert relative to a tool axis,
the cutting insert comprising a single unitary piece of material comprising at least a first dovetail cutting tooth and a second dovetail cutting tooth, the first dovetail cutting tooth separate and spaced from the second dovetail cutting tooth along a line that is parallel to the tool axis,
the first dovetail cutting tooth extending away from the tool axis in a first direction, the first direction perpendicular to the tool axis,
the second dovetail cutting tooth extending away from the tool axis in said first direction,
the first dovetail cutting tooth having a first tooth first flank and a first tooth second flank, an axis of the first dovetail cutting tooth extending between the first tooth first flank and the first tooth second flank, the axis of the first dovetail cutting tooth perpendicular to the tool axis, a spacing between the first tooth first flank and the first tooth second flank at a first distance from the tool axis greater than a spacing between the first tooth first flank and the first tooth second flank at a second distance from the tool axis, the first distance from the tool axis greater than the second distance from the tool axis, the second dovetail cutting tooth having a second tooth first flank and a second tooth second flank, an axis of the second dovetail cutting tooth extending between the second tooth first flank and the second tooth second flank, the axis of the second dovetail cutting tooth perpendicular to the tool axis, the axis of the first dovetail cutting tooth parallel to the axis of the second dovetail cutting tooth, a spacing between the second tooth first flank and the second tooth second flank at a third distance from the tool axis greater than a spacing between the second tooth first flank and the second tooth second flank at a fourth distance from the tool axis, the third distance from the tool axis greater than the fourth distance from the tool axis.

2. A device as recited in claim 1, wherein:
the cutting insert further comprises a third projection;
the third projection is a displacement structure which is configured to plastically deform a structure by applying blunt force,
the second dovetail cutting tooth is spaced from the first dovetail cutting tooth by a first pitch,
the third projection is spaced from the second dovetail cutting tooth by a distance that differs from the first pitch, and
the third projection is spaced from the first dovetail cutting tooth by a distance that differs from the first pitch.

3. A device as recited in claim 1, wherein the cutting insert further comprises at least a third projection,
the third projection is a cutting tooth,
the second dovetail cutting tooth is spaced from the first dovetail cutting tooth by a first pitch, and
the third projection is spaced from the second dovetail cutting tooth by the first pitch.

4. A device as recited in claim 1, wherein:
the cutting insert further comprises a third projection,
the third projection is a displacement structure, and the third projection is configured to plastically deform a structure by applying blunt force,
the second dovetail cutting tooth is between the first dovetail cutting tooth and the third projection.

5. A device as recited in claim 2, wherein the cutting insert further comprises at least a fourth projection,
the fourth projection is a cutting tooth,
the fourth projection is spaced from the second dovetail cutting tooth by the first pitch or a multiple of the first pitch.

6. A device as recited in claim 1, wherein the cutting insert is configured to produce a coil-shaped groove in a cylindrical surface.

7. A device as recited in claim 1, wherein the cutting insert is configured to produce in a cylindrical surface, (1) a groove, said groove coil-shaped, and (2) an intermediate groove between portions of said groove to produce undercut-like material deformations in said groove.

8. A device as recited in claim 1, wherein the cutting insert further comprises at least a first cleaning tooth.

9. A device as recited in claim 1, wherein:
the cutting insert comprises a pre-machining and safety tooth having a first tooth cross section and a first projecting length, a groove pre-machining tooth having a second tooth cross-section that is greater than the first tooth cross-section and a second projecting length that is greater than the first projecting length, and at least one shaping tooth having at least one lateral slanted flank, the lateral slanted flank having a width that is greater than a width of the groove pre-machining tooth.

10. A device as recited in claim 1, wherein:
the cutting insert further comprises a third cutting tooth,
the third cutting tooth extends away from the tool axis in said first direction,
the third cutting tooth is separate and spaced from the first dovetail cutting tooth and is separate and spaced from the second dovetail cutting tooth along said line that is parallel to the tool axis,
the second dovetail cutting tooth is between the third cutting tooth and the first dovetail cutting tooth,
the third cutting tooth has a third tooth first flank and a first tooth second flank,
no spacing between the third tooth first flank and the third tooth second flank is greater at any distance from the tool axis that is greater than at any other distance from the tool axis.

11. A device as recited in claim 1, wherein:
the cutting insert further comprises a third dovetail cutting tooth and a fourth dovetail cutting tooth,
the third dovetail cutting tooth and the fourth dovetail cutting tooth each extend away from the tool axis in said first direction,
the second dovetail cutting tooth is between the first dovetail cutting tooth and the third dovetail cutting tooth,
the third dovetail cutting tooth is between the second dovetail cutting tooth and the fourth dovetail cutting tooth,
the third dovetail cutting tooth comprises a third tooth first flank and a third tooth second flank,
the fourth dovetail cutting tooth comprises a fourth tooth first flank and a fourth tooth second flank,
the first tooth first flank is substantially parallel to a first plane, the first plane perpendicular to the tool axis,
at increasing distances from the tool axis, the first tooth second flank diverges from the first plane away from the first tooth first flank,
the second tooth first flank is substantially parallel to the first tooth first flank,
at increasing distances from the tool axis, the second tooth second flank diverges from the first plane away from the second tooth first flank,
at increasing distances from the tool axis, the third tooth first flank diverges from the first plane away from the third tooth second flank,
at increasing distances from the tool axis, the third tooth second flank diverges from the first plane away from the third tooth first flank,
at increasing distances from the tool axis, the fourth tooth first flank diverges from the first plane away from the fourth tooth second flank, and at increasing distances from the tool axis, the fourth tooth second flank diverges from the first plane away from the fourth tooth first flank.

12. A device as recited in claim 11, wherein the second tooth first flank does not face the first tooth first flank.

13. A device as recited in claim 1, wherein:
the cutting insert further comprises a third dovetail cutting tooth and a fourth dovetail cutting tooth,
the third dovetail cutting tooth and the fourth dovetail cutting tooth each extend away from the tool axis in said first direction,
the second dovetail cutting tooth is between the first dovetail cutting tooth and the third dovetail cutting tooth,
the third dovetail cutting tooth is between the second dovetail cutting tooth and the fourth dovetail cutting tooth,
the third dovetail cutting tooth comprises a third tooth first flank and a third tooth second flank,
the fourth dovetail cutting tooth comprises a fourth tooth first flank and a fourth tooth second flank,
the first tooth second flank faces the second tooth first flank,
the second tooth second flank faces the third tooth first flank,
the third tooth second flank faces the fourth tooth first flank,
the first tooth first flank is substantially parallel to a first plane, the first plane perpendicular to the tool axis,
at increasing distances from the tool axis, the first tooth second flank diverges from the first plane toward the second tooth first flank,
the second tooth first flank is substantially parallel to the first plane,
at increasing distances from the tool axis, the second tooth second flank diverges from the first plane toward the third tooth first flank,
at increasing distances from the tool axis, the third tooth first flank diverges from the first plane toward the second tooth second flank,
at increasing distances from the tool axis, the third tooth second flank diverges from the first plane toward the fourth tooth first flank,
at increasing distances from the tool axis, the fourth tooth first flank diverges from the first plane toward the third tooth second flank, and
at increasing distances from the tool axis, the fourth tooth second flank diverges from the first plane away from the fourth tooth first flank.

14. A method for producing a cylindrical surface that has a surface structure of predetermined geometry suitable for application of material by thermal spraying, the method comprising:
operating a device as recited in claim 1 such that the tool rotates the cutting insert relative to the tool axis and contacting the cutting insert with a hollow cylindrical surface to form at least one geometrically determined groove structure of a depth and a width, which groove structure is helical and has a determined groove pitch into the hollow cylindrical surface,
wherein the tool is embodied as a follow-on tool and having comb-like and sequentially arranged teeth of different cross-sections that successively process an undercut groove cross-section to a finished size, and wherein the groove structure is introduced into the cylindrical substrate surface in such a way that a) first, by means of at least one leading groove pre-machining tooth of the cutting insert, a base groove with a groove bottom width that is less than the groove bottom width of the finished groove is introduced, and
b) via subsequent shaping teeth, which are displaced from each other by the groove pitch or by a multiple of the groove pitch, the base groove is further processed by a cutting action so that an undercut constriction of the grooves introduced into the surface is created on at least one side or flank of the groove introduced into the substrate.

15. The method according to claim 14, wherein the worked-in groove structure formed by the shaping teeth is additionally deformed in such a way that the groove openings are further constricted by upsetting deformations of material.

16. The method according to claim 14, wherein the in the shaping step via the pre-machining tooth (54-2 the base groove (52B) is formed into the substrate surface (60) by deformation.

17. The method according to claim 14, characterized in that during the shaping step via the shaping teeth (54-3 to 54-9) during material removal the surface is roughened and a structuring and/or undercut and/or roughness is produced.

18. The method according to claim 14, characterized by a final cleaning step in which the finished groove cross-section is cleaned.

19. The method according to claim 14, in which at least one, e.g., substantially parallelepipedal, shaping and cutting plate (34) is used which is attached to a support part (12) and which carries at one lateral edge (38), that can be aligned parallel to the cylindrical substrate surface to be processed, at least three comb-like sequentially arranged teeth (54-1, 54-2, 54-4), of which a first tooth forms a pre-machining and safety tooth (54-1) with a first tooth cross section and a first projecting length (V54-1), at least one second, following/trailing tooth forms a groove-pre-machining tooth (54-2) with a second tooth cross-section that is greater than the first cross-section and a second projecting length (V54-2) that is greater than the first projecting length (V54-1), and at least one third tooth (54-4) following/trailing the at least one second tooth (54-2) forms a shaping tooth (for example, a dovetail tooth) (54-4) with at least one lateral, slanted flank (55) by which the tooth head becomes wider with regard to the tooth width (B54-2, B54-4) of the tooth (54-2) that is previously in engagement such that the base groove can be processed successively to a finished size (B).

20. The method according to claim 14, wherein the method is performed as a shaping, cutting, or honing process.

21. The method according to claim 19, wherein following the shaping via the groove-pre-machining tooth (54-2) and prior to enacting the shaping via the at least one shaping tooth (54-4), a further groove-pre-machining step is carried out via a tooth (54-3) that has a projecting length (V54-3) that is substantially of the same size as the projecting length (V54-4) of the shaping tooth (54-4), wherein the lateral spacing (S) of the groove-pre-machining teeth (54-2, 54-3) and of the at least one shaping tooth (54-4) are of the same size.

22. The method according to claim 19, wherein the shaping of the groove via said neighboring shaping teeth (54-4 to 54-7) different flanks (52-1, 52-2) of the undercut groove (52) are processed.

23. The method according to claim 14, wherein forming of the undercut groove is carried out by cutting teeth are embodied redundantly.

24. A device, comprising:
a tool; and
a cutting insert comprising a first portion and a second portion, the first portion comprising a base plate mounted to the tool, the second portion comprising cutting teeth that each comprise a proximal end and a distal end, each proximal end of each cutting tooth being attached to the base plate,
the cutting insert mounted on the tool,
the tool configured to rotate the cutting insert relative to a tool axis,
the cutting insert comprising:
at least a first projection and a second projection, the first projection spaced from the second projection along a line that is parallel to the tool axis,
the first projection is a dovetail cutting tooth,
the second projection is a displacement structure,
the first projection extending away from the tool axis in a first direction, the first direction perpendicular to the tool axis,
the second projection extending away from the tool axis in said first direction,
the first projection having a first tooth first flank and a first tooth second flank,
an axis of the first projection extending between the first tooth first flank and the first tooth second flank,
the axis of the first projection perpendicular to the tool axis,
a spacing between the first tooth first flank and the first tooth second flank at a first distance from the tool axis greater than a spacing between the first tooth first flank and the first tooth second flank at a second distance from the tool axis, the first distance from the tool axis greater than the second distance from the tool axis.

25. A device as recited in claim 24, wherein the cutting insert further comprises at least a third projection, and the third projection is a second displacement structure.

26. A device as recited in claim 24, wherein the cutting insert further comprises at least a third projection, and the third projection is a cutting tooth.

27. A device as recited in claim 26, wherein:
the third projection is spaced from the first projection by a first pitch, and
the second projection is spaced from the third projection by a distance that differs from the first pitch.

28. A device as recited in claim 25, wherein the cutting insert further comprises at least a fourth projection and a fifth projection.

29. A device as recited in claim 25, wherein the third projection is between the first projection and the second projection.

30. A device as recited in claim 26, wherein the third projection is between the first projection and the second projection.

31. A device as recited in claim 27, wherein the third projection is between the first projection and the second projection.

32. A device as recited in claim 27, wherein the cutting insert further comprises at least a fourth projection,
the fourth projection is a cutting tooth,
the fourth projection is spaced from the third projection by the first pitch or a multiple of the first pitch.

33. A device as recited in claim 24, wherein the cutting insert is configured to produce a coil-shaped groove in a cylindrical surface.

34. A device as recited in claim 24, wherein the cutting insert further comprises at least a first cleaning tooth.

35. A device as recited in claim 24, wherein:
the cutting insert comprises a pre-machining and safety tooth having a first tooth cross section and a first projecting length, a groove pre-machining tooth having a second tooth cross-section that is greater than the first tooth cross-section and a second projecting length that is greater than the first projecting length, and at least one shaping tooth having at least one lateral slanted flank, the lateral slanted flank having a width that is greater than a width of the groove pre-machining tooth.

36. A device as recited in claim 24, wherein the cutting insert is a single unitary piece of material comprising at least the first projection and the second projection.

37. Tool for producing a cylindrical surface that has a surface structure of predetermined geometry suitable for application of material by thermal spraying, with which at least one geometrically determined groove structure, which is helical and has a determined groove pitch, can be introduced into a cylindrical substrate surface, said tool being embodied as a follow-on tool, with which a groove cross-section can be processed successively to a finished size,
the tool comprising a cutting insert comprising a first portion and a second portion, the first portion comprising a base plate mounted to the tool, the second portion comprising cutting teeth that each comprise a proximal end and a distal end, each proximal end of each cutting tooth being attached to the base plate, wherein the cutting teeth are comb-like, sequentially arranged and of different cross-sections, said teeth comprising at least one pre-machining tooth and at least two subsequent shaping teeth, wherein the groove structure can be introduced into the cylindrical substrate surface by only rotating at least one of the tool and the cylindrical substrate surface about a tool axis that is coaxial with an axis of the cylindrical substrate surface such that a relative rotational movement between the tool and the cylindrical substrate surface is generated, and moving at least one of the tool and the cylindrical substrate surface along the tool axis such that an axial relative displacement between the tool and the cylindrical substrate is generated, in that first, by means of at least one leading groove pre-machining tooth, a base groove with a groove bottom width that is less than the groove bottom width of the finished groove can be introduced, and in that via subsequent shaping teeth, which are displaced to each other by the groove pitch or by a multiple of the groove pitch, this base groove can be further processed by a cutting action in that an undercut of the grooves introduced into the surface is created on at least one side or flank of the groove introduced into the substrate.

38. Tool according to claim 37, wherein the tool comprises a displacement tooth with which the worked-in groove structure can be deformed in such a way that the groove openings are constricted by upsetting deformations of material.

39. Tool according to claim 37, wherein the pre-machining tooth working the base groove into the substrate surface is formed as a deformation tooth.

40. Tool according to claim 37, wherein for producing the base groove a plurality of pre-machining teeth are provided with which introducing of the base groove can be divided into partial steps.

41. Tool according to claim 37, wherein at least one shaping tooth is formed such that during material removal the surface is roughened and a structuring and/or undercut and/or roughness is produced.

42. Tool according to claim 37, wherein the tool comprises a cleaning tooth with which the groove cross-section can be cleaned.

43. Tool according to claim 37, wherein the tool comprises a support part on which at least one, substantially parallelepipedal shaping and cutting plate is attached that carries at one lateral edge, that can be aligned parallel to the cylindrical substrate surface to be processed, at least three comb-like sequentially arranged teeth, of which a first tooth is configured to form a pre-machining and safety tooth with a first tooth cross section and a first projecting length, at least one second, following/trailing tooth forms a groove-pre-machining tooth with a second tooth cross-section that is configured to change the first cross-section, and at least one third tooth following/trailing the at least one second tooth forms a shaping tooth with at least one lateral, slanted flank by which the tooth cross-section is widened into an undercut shape that the base groove is processed successively to a finished size.

44. Tool according to claim 37, wherein the tool is a shaping, cutting, or honing tool.

45. Tool according to claim 43, wherein between the groove-pre-machining tooth and the at least one shaping tooth, a further groove-pre-machining tooth is provided that has a projecting length that is substantially of the same size as the projecting length of the shaping tooth, wherein lateral spacing of the groove-pre-machining teeth and of the at least one shaping tooth are of the same size.

46. Tool according to claim 43, wherein several neighboring shaping teeth are provided with which different flanks of the undercut groove to be formed can be processed.

47. Tool according to claim 38, wherein adjacent to the at least one shaping tooth on an opposite side relative to a safety tooth, there is a displacement tooth that has across a predetermined length a projecting length corresponding to that of the safety tooth and has at its center section a rounded projection.

48. Tool according to claim 47, wherein the lateral spacing of the projection from a neighboring tooth is different from the lateral spacing of the other teeth relative to one another.

49. Tool according to claim 43, wherein the safety tooth has a width that is a multiple of the width of the at least one groove-pre-machining tooth or of the at least one shaping tooth.

50. Tool according to claim 37, wherein the tool comprises cutting teeth that are embodied redundantly so that also in case of tool wear a uniform groove geometry is ensured.

51. Tool according to claim 43, wherein the geometry of the pre-machining and safety tooth is chosen such that identical forces act on the subsequent teeth and on cutting edges.

52. Tool according to claim 37, wherein the shaping teeth are comprised of wear-resistant material.

53. Tool according to claim 52, wherein the shaping teeth are formed in a cutting insert that has a shape of a prism block or parallelepipedal block and is comprised of a composite part in which a hard material is seated on a support comprised of hard metal, attached by brazing, wherein the shaping teeth extend across a separating plane of the two materials.

54. Tool according to claim 53, wherein the cutting insert is secured positively in a cutting plate that is embodied as an indexable insert, is brazed.

55. Tool according to claim 54, wherein the cutting plate is supported by a holder that is seated adjustably on a tool module in such a way that the cutting insert can be aligned substantially parallel to an axis of the circular-cylindrical surface to be processed.

56. Device for producing a cylindrical surface in a workpiece, wherein the cylindrical surface has a surface structure of predetermined geometry suitable for application of material by thermal spraying, employing a tool according to claim 37, wherein the tool and/or the workpiece is rotationally drivable, the device comprising a tool support that has at least two degrees of freedom of movement, of which one is the advancing direction of the tool and/or of the workpiece parallel to the axis of rotation of the tool or the workpiece and the other determines the advancing direction extending at an angle thereto, wherein the advance can be adjusted to the relative rotary speed between the tool and the workpiece.

57. Tool according to claim 43, wherein the pre-machining and safety tooth has a first tooth cross section and a first projecting length, the at least one groove-pre-machining tooth has a second tooth cross-section that is greater than the first cross-section and a second projecting length that is greater than the first projecting length, and at least one shaping tooth has at least one lateral, slanted flank by which the tooth head becomes wider with regard to the tooth width of the tooth that is previously in engagement.

* * * * *

UNITED STATES PATENT AND TRADEMARK OFFICE
CERTIFICATE OF CORRECTION

| | | |
|---|---|---|
| PATENT NO. | : 10,259,059 B2 | Page 1 of 1 |
| APPLICATION NO. | : 14/138932 | |
| DATED | : April 16, 2019 | |
| INVENTOR(S) | : Bernhard Gand et al. | |

It is certified that error appears in the above-identified patent and that said Letters Patent is hereby corrected as shown below:

In the Specification

Column 3, Line 8:
Please change: "example, dovetail tooth) with a least one lateral slanted flank" to -- example, dovetail tooth) with at least one lateral slanted flank --

In the Claims

Column 18, Line 17, Claim 16:
Please change: "The method according to claim 14, wherein the in the" to -- The method according to claim 14, wherein the --

Signed and Sealed this
Twenty-fifth Day of June, 2019

Andrei Iancu
*Director of the United States Patent and Trademark Office*